July 9, 1957 F. W. CUMMINGS ET AL 2,798,933
APPARATUS FOR MAKING ELECTRIC WIRING CONDUITS
Filed Nov. 1, 1954
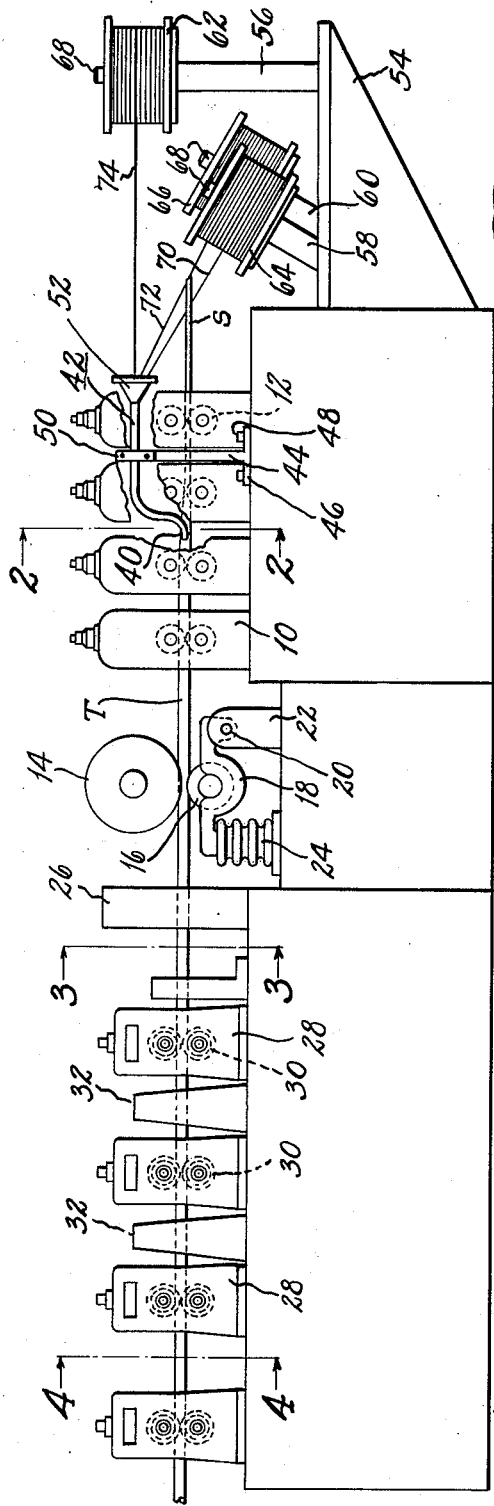
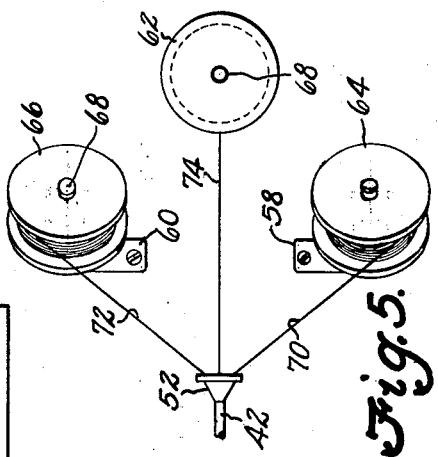
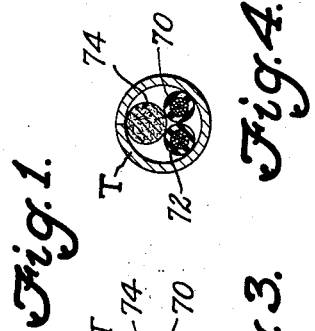
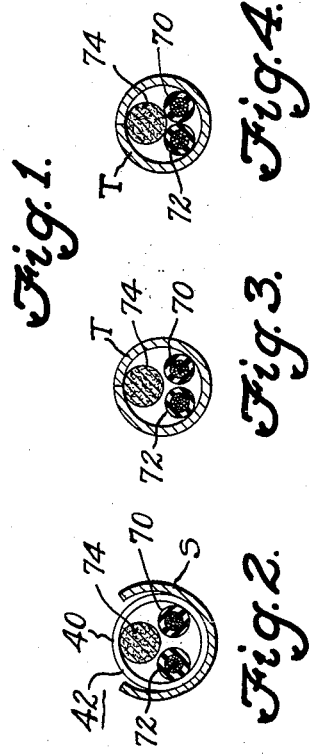
INVENTORS
FREDERICK W. CUMMINGS
HENRY D. MOWERS
ATTORNEY

# United States Patent Office 2,798,933
Patented July 9, 1957

2,798,933

APPARATUS FOR MAKING ELECTRIC WIRING CONDUITS

Frederick W. Cummings, Pittsford, and Henry D. Mowers, Spencerport, N. Y., assignors to General Motors Corporation, Detroit, Mich., a corporation of Delaware Application November 1, 1954, Serial No. 466,170

1 Claim. (Cl. 219—59)

This invention relates to electric wiring conduits and particularly conduits in which conducting wires for electric current are positioned within and surrounded by a metal tube.

It is most desirable and in some locations it is required that in all wiring installations on buildings, the conducting wires be surrounded by metal tubing of some sort to minimize the fire hazard, and for other reasons. It is also desirable to provide a metal covering for electric wires in other installations for protective purposes. Generally, the tubing which is used is a flexible tube made from a spiral strip, the adjacent spirals of which overlap to form a continuous tube through which the conducting wires extend. This tube is generally made separately and the wires are inserted into the tube after it is formed.

It is the principal purpose of the present invention to devise a method of forming a wiring conduit comprising a metal tube surrounding conducting wires which is formed continuously from a flat strip of steel or other metal which is bent into a tube with abutting edges that are welded together as the strip and formed tube is moved continuously through the forming and welding apparatus, while the conducting wires and insulating filler material are inserted into the tube continuously during the forming operation and move with the tube. A further object of the invention is to provide a suitable apparatus for carrying out the method described.

According to the present invention, a flat strip of steel or other metal is drawn through a group of forming devices through suitable electric welding apparatus which welds the seam as the formed tube passes continuously through the welder. After the tubing passes the welder, it goes through a scarfing device to remove excess material at the welded seam and then passes through a series of sizing devices which accurately size the tubing to the exact diameter desired and can be also effective to modify the wall thickness of the tubing so as to form a tube having the exact wall thickness desired.

Before the metal strip is formed into a complete tube and while it is still open at the top and somewhat U-shaped, the conducting wires and filler material which is generally in the form of a rope, are introduced. The specific character of the filler material is not material. For example, any suitable fibrous material like hemp or asbestos, or materials in combination with asbestos or a suitable plastic, can be used. The conductor wires and the rope of filler material are rolled on reels and the operator initially feeds the ends of the conductor wires and the rope of filler into the funnel-shaped inlet end of a tube manually, the small outlet end of which extends into the moving tube which is being formed from flat strip material before it is fully formed and while it is substantially U-shape.

These conductor wires and rope of filler material are pushed along with the tube as it passes the welder and until it reaches the sizing devices. The sizing devices reduce the diameter of the tubing and the latter grips or squeezes the conductor wires and filler material so that the friction between the inner wall of the tube, the conductor wires and the filler material is sufficient to carry such elements along with the tubing. Therefore, except at the start of the operation, it is unnecessary for the operator to move the wires and filler material in the tubing in the manner described so that the operation, after it is initiated, is entirely automatic until the reels on which the conductor wires and filler material are wound become empty. When this occurs, the operation described is repeated in order to effect insertion of the wires and filler material in the tube, or the wires and filler material could be spliced, if desired, to wires and filler material on new reels.

Further objects and advantages of the present invention will be apparent from the following description, reference being had to the accompanying drawings wherein a preferred embodiment of the present invention is clearly shown.

In the drawings:

Figure 1 is a digrammatic view of an apparatus for carrying out the method which constitutes a part of the present invention;

Figures 2, 3 and 4 are detail sections on lines 2—2, 3—3 and 4—4, showing the conduit in different stages of its formation; and Figure 5 is a fragmentary plan view showing the relative position of the reels which hold the conductor wires and filler material.

The specific apparatus shown in the drawings, in so far as the formation of the tube which carries the conducting wires is concerned, may be of substantially the same form as shown in the copending application of Hahn, S. N. 101,402, filed June 25, 1949 and the specific construction of this part of the apparatus forms no part of the present invention. This being true, the tube forming mill is not shown in its entirety and what is shown is illustrated only diagramatically.

Referring to Fig. 1 of the drawing, the tube mill comprises a series of forming devices 10, each of which has a pair of forming rolls 12 that progressively form a flat strip S of steel or other metal into a tube T, with the edges of the strip abutting at the top as indicated in Fig. 3, as the strip S moves continuously through the forming mill from right to left. After the tube leaves the several forming devices, it passes through a welding apparatus which may be of the form shown in the patent to Nichols, 2,293,846, August 25, 1942, and comprises a pair of spaced electrode rolls 14, only one of which is shown. The tube passes the electrodes so that the abutting edges are in the space between the rolls and the tube is held against the electrode by a pressure roller 16 rotatably supported by a lever 18, pivoted at 20 on standards 22 extending upwardly from the base of the machine. The left end of lever 18 is engaged by the upper end of a bellows 24, the lower end of which is supported on the base of the apparatus. Fluid, such as compressed air, may be supplied to the interior of the bellows to cause the roll 16 to exert whatever pressure is desired on the tube T. Obviously, other means, such as a spring could be employed instead of the bellows 24.

When the tube is welded, a considerable bead is formed at the seam so that when the tube leaves the welder, it first passes through a scarfing unit, the construction of which is not shown, but is designated by the rectangle 26. The construction of this device is wholly immaterial with respect to the present invention, but it includes a scraping or cutting tool to remove the excess bead formed at the tube seam during the welding operation.

The tubing next passes through a plurality of sizing devices 28, each of which has a pair of sizing rolls 30 and between some of the sizing devices are forming devices 32 generally termed turks heads, which may have pairs of forming rolls or four forming rolls. By operating the sizing devices 28 at the proper speeds the tube T may be reduced to the exact diameter desired without any change in the wall thickness of the tube, or the wall of the tube may be made thicker or thinner as desired, simultaneously with the change in diameter. This sizing apparatus may be of the same construction and effects the same functions as the device disclosed in the copending application of Hahn et al., S. N. 410,986, filed February 17, 1954 and the specific construction of the sizing apparatus forms no part of the present invention.

After the strip S passes through two of the forming devices 10, it has the form indicated in section in Fig. 2, being somewhat U-shaped with a relatively wide opening at the top. Extending through this opening into the tube T is the delivery end 40 of a tube 42 through which the conducting wires and filled material are introduced into the tube T. This tube 42 is supported on a standard 44 extending upwardly from a base secured to the base of the apparatus. The standard and its base are substantially T-shaped, the base being about as long as the standard is high and having flanges 46 at its ends secured by bolts 48 to the base of the apparatus. The tube 42 is secured in position at the upper end of the standard between the latter and an attaching clamp 50 secured by screws to the standard. The standard is positioned so that the tube 42 is above and in substantial alignment with the tube T, while the upper end of the standard 44 and the clamp 50 are so shaped that the space between the standard and clamp in which the tube 42 is received is substantially cylindrical. The supporting standard for the tube 42 might also be in the form of an A with the supporting legs bolted to the base of the apparatus at their lower ends and suitable clamping means formed at the apex thereof to receive the tube 42 and hold it in position.

The right end of tube 42 is funnel-shaped, as indicated at 52 so as to more readily receive the conducting wires and filler material which the tube 42 guides into the tube T when the latter is not fully formed and is of substantially the shape shown in Fig. 2.

Extending upwardly from an extension 54 of the apparatus support are three standards, 56, 58 and 60 on which three reels, 62, 64 and 66 are suitably supported for rotation. The upper ends of the standards may be reduced as indicated at 68 to provide shoulders on which the reels can rotate, or any other suitable mounting means may be employed.

As shown, the conducting wires 70 and 72 are wound on the reels 64 and 66, respectively, while the filler material 74, which may be fibrous in character and of any suitable substance, is in the form of a small rope and is wound on the reel 62. It will be apparent that as the strip S is continuously moved through the apparatus to form the tube T, conducting wires may be continuously drawn from the reels 64 and 66 and filler material from the reel 62, through the tube 42, into tube T at the point where the delivery end 40 of tube 42 enters the tube T and will move continuously with the tube T as the latter is moved through the tube forming apparatus, so that when the formation of tube T is completed, the conducting wires and filler material are positioned within the tube throughout its entire length.

As already indicated, when operation of the device is initiated, the conducting wires and filler material must be manually pushed into the tube T until the ends of such wires and filler material reach a point where the diameter of the tube is sufficiently reduced to grip such elements as indicated in Fig. 4. After this takes place, movement of the tube T automatically effects movement of the wires and filler materials until the reels on which such materials are wound, are empty. When new reels have to be substituted for those emptied, the initial manual operation must be repeated or the ends of the conducting wires and filler material on the full reels can be spliced to the ends of these elements which have been unwound from the emptied reels, and the wires and filler material will be carried on with the tube T, without the necessity of the initial manual operation.

It will be noted particularly that the reels 64 and 66 on which the conducting wires are wound are at the same height above the supporting member 54, and the reel 62, which carries the filler material, is above the reels 64 and 66. This arrangement is provided so that as the wires and filler material are inserted in and moved through the guiding member 42, the wires will be in the lower part of the guiding member 42 with the filler material above such wires, positioned between the latter and the welded seam. The wires and filler material are moved out of the guide member 42 and into the tube T while occupying this same relative position, as indicated in Figs. 2, 3 and 4, during the entire formation of the tube.

The positioning of the wires and filler material in this particular manner is obviously desirable as a protective measure, but in the light of actual experience, is probably unnecessary. It is desired, of course, to prevent any possible burning of the insulation on wires 70 and 72 during the welding of the seam at the top of tube T, so that the wires are positioned in the bottom part of the tube as far from the welded seam as possible and the filler material, being positioned between the wires and the top of tube T, also protects the wiring insulation against any possible burning. It is apparent that any slight scorching of the filler material would be of no importance. However, the heating of the tube during the welding operation is extremely localized so that the tube is heated to a material extent only in the area immediately adjacent the seam and, due to the rapid movement of the tube past the welding device, the heating of the tube by the welding operation, at any particular point, is effected for a very brief period of time. Also, during the welding operation, the tube has not been reduced to its final diameter and the wires and filler material are not clamped tightly within the tube when the welding operation takes place, but are somewhat loose in the tube and it has been found in actual practice, when using filler material in the form of a hemp rope, that the welding operation is effected without any burning of the filler material.

It is apparent that with the apparatus described, a conduit comprising a metal tube surrounding conducting wires and filler material may be formed continuously and automatically from a flat metal strip by introducing the wires and filler material into the tube as the latter is formed from the flat strip. The conduit thus formed may be cut into any desired lengths for any of the many uses a conduit of this character would have and which would include any of the uses to which the flexible conduit generally in use may be put. Also, being more rigid and of much greater strength than the conventional flexible conduit, it has other uses such, for example, as supporting hangers for light fixtures. Also, due to the rigid form of the conduit, it would be particularly useful when associated with machine tools.

While the embodiment of the present invention as herein disclosed constitutes a preferred form, it is to be understood that other forms might be adopted.

What is claimed is as follows:

Apparatus for forming an electric conduit comprising a metal tube having individual conducting wires the diameters of which are substantially smaller than that of the metal tube and filler material positioned therein throughout its length having in combination, forming devices operable to progressively bend a flat metal strip into tubular shape with the edges of the strip abutting each other and to move said tubing continuously through the apparatus during its formation thereby, a tubular guiding member having a flared inlet adapted to receive and guide the conducting wires and filler material into the moving tube, said guiding member being supported adjacent the moving tube and having its outlet end extending into said moving tube at a point intermediate the tube forming devices and at which the moving tube is partially open, whereby the conducting wires and filler material which are received by said member are directed into the moving tube during its continuous movement and before it is fully formed, means for rotatably supporting reels of conducting wire adjacent the inlet end of said guiding member, means for rotatably supporting a reel of filler material in rope form adjacent the inlet end of said guiding member and at a higher level than the conducting wires so that the wires and filler material may be readily introduced into and moved through the guiding member into the moving tube with the filler material above the wires, and means for moving the tube past the remaining forming devices to completely form the tube after the conducting wires and filler material are positioned therein, means for welding the abutting edges of said strip after the tube is fully formed therefrom, and means for thereafter reducing the diameter of the tube to the extent desired and sufficiently to exert appreciable pressure on the conducting wires and filler material so that movement of the tube through the forming apparatus effects simultaneous movement of said conducting wires and filler material.

References Cited in the file of this patent

UNITED STATES PATENTS

| | | |
|---|---|---|
| 505,380 | Barrett | Sept. 19, 1893 |
| 2,029,044 | Westlinning | Jan. 28, 1936 |
| 2,697,769 | Carpenter | Dec. 21, 1954 |
| 2,697,772 | Kinghorn | Dec. 21, 1954 |